US00RE39054E

(19) United States
(12) Reissued Patent
Kagata et al.

(10) Patent Number: US RE39,054 E
(45) Date of Reissued Patent: Apr. 4, 2006

(54) VEHICLE DRIVE SYSTEM INCLUDING DRIVE MODE-SHIFTING MECHANISM FOR SHIFTING BETWEEN TWO-WHEEL DRIVE AND FOUR-WHEEL DRIVE

(75) Inventors: Toru Kagata, Toyota (JP); Masumi Kazaoka, Ama-gun (JP)

(73) Assignee: Aisin Seiki Kabushiki Kaisha, Kariya (JP)

(21) Appl. No.: 10/284,507

(22) Filed: Oct. 31, 2002

Related U.S. Patent Documents

Reissue of:
(64) Patent No.: 5,997,428
Issued: Dec. 7, 1999
Appl. No.: 09/066,058
Filed: Apr. 27, 1998

(30) Foreign Application Priority Data

Apr. 25, 1997 (JP) ..... 9-108637

(51) Int. Cl.
*F16H 37/08* (2006.01)
*B60K 23/08* (2006.01)

(52) U.S. Cl. ..... 475/198; 180/247; 475/202; 192/82 P; 192/84.6

(58) Field of Classification Search ..... 180/247; 192/69.9, 82 P, 84.6; 475/198, 202, 222; 74/665 T See application file for complete search history.

(56) References Cited

U.S. PATENT DOCUMENTS 44,124 A * 9/1864 Sweet
3,058,558 A * 10/1962 Hawk
3,132,531 A * 5/1964 Boughner ..... 74/335
3,827,520 A 8/1974 Mueller (Continued)

FOREIGN PATENT DOCUMENTS

JP 56-143544 3/1965
JP 1-23330 * 10/1981
JP 59-102432 U 7/1984
JP 61-199428 U 12/1986

(Continued)

OTHER PUBLICATIONS

"All Abouth the 4WD of Mazda," *Four Wheels Drive Mechanism Manual*, with partial translation of section entitled, "Viscous Coupling,", 8 pages.

"Alto Fronte," *Suzuki Service Manual*, No. 1, with translation of elements in the drawing figures, 7 pages.

*Primary Examiner*—Dirk Wright
(74) *Attorney, Agent, or Firm*—Burns, Doane, Swecker & Mathis LLP

(57) ABSTRACT

A vehicle drive system includes a compact drive mode-shifting mechanism that is mounted in the final drive gearset of a vehicle. The drive mode-shifting mechanism includes a first shaft, a second shaft, and a clutch assembly. The first shaft forms an input shaft for the differential for a pair of wheels, the second shaft transmits engine power and the clutch assembly connects and disconnects the first and second shafts to one another to effect either the two-wheel-drive mode or the four-wheel-drive mode. The first shaft has an outer surface provided with a first spline, the second shaft has an outer surface provided with a second spline, and said clutch assembly includes an axially movable shifting member provided with an internal spline. The shifting member is movable between a first position in which the internal spline on the shifting member is in engagement with the first spline on the first shaft and the second spline on the second shaft to achieve the four-wheel-drive more and a second position in which the internal spline on the shifting member is in engagement with the first spline on the first shaft and is out of engagement with the second spline on the second shaft to achieve the two-wheel-drive mode.

34 Claims, 3 Drawing Sheets

U.S. PATENT DOCUMENTS

Figure 1:
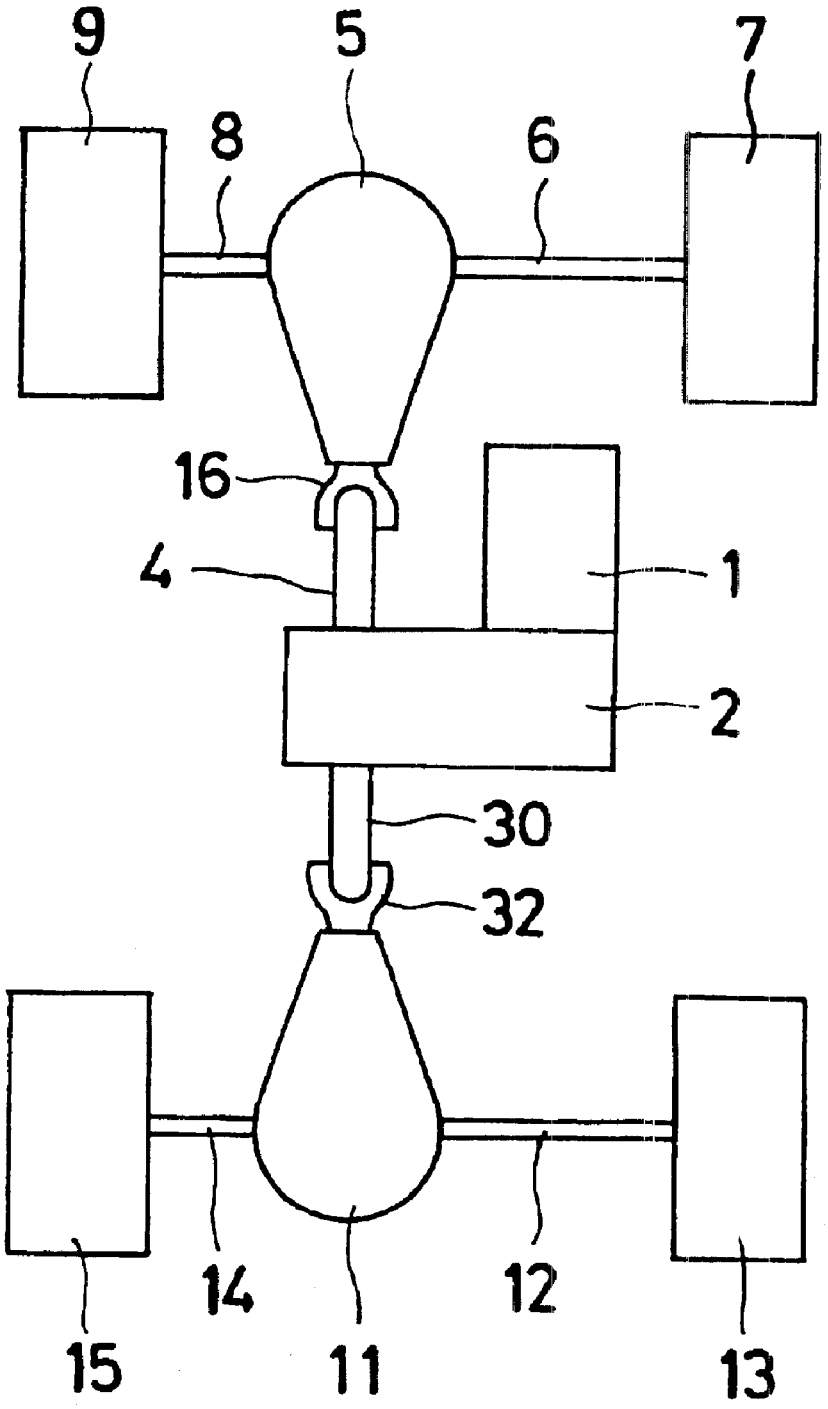

| | | | | |
|---|---|---|---|---|
| 4,341,281 | A | | 7/1982 | Nagy |
| 4,682,516 | A | * | 7/1987 | Okubo |
| 4,788,888 | A | | 12/1988 | Tsutsumikoshi |
| 4,805,472 | A | | 2/1989 | Aoki et al. |
| 4,862,989 | A | | 9/1989 | Kano et al. |
| 4,938,307 | A | * | 7/1990 | Sasaki et al. |
| 4,991,680 | A | | 2/1991 | Shiba et al. |
| 5,005,663 | A | * | 4/1991 | Niide et al. |
| 5,103,690 | A | * | 4/1992 | Macpherson et al. |
| 5,150,637 | A | | 9/1992 | Ninomiya et al. |
| 5,605,213 | A | * | 2/1997 | White |

FOREIGN PATENT DOCUMENTS

| | | | | |
|---|---|---|---|---|
| JP | 63-301135 | A | | 12/1988 |
| JP | 64-90823 | A | * | 4/1989 |
| JP | 1-23330 | B2 | | 5/1989 |
| JP | 2-136332 | A | * | 5/1990 |
| JP | 4-48978 | Y2 | * | 11/1992 |

* cited by examiner

VEHICLE DRIVE SYSTEM INCLUDING DRIVE MODE-SHIFTING MECHANISM FOR SHIFTING BETWEEN TWO-WHEEL DRIVE AND FOUR-WHEEL DRIVE

Matter enclosed in heavy brackets [ ] appears in the original patent but forms no part of this reissue specification; matter printed in italics indicates the additions made by reissue.

FIELD OF THE INVENTION

The present invention generally relates to a drive train shifting mechanism. More particularly, the present invention pertains to a vehicle drive system provided with a mechanism for shifting the drive train through which engine power is transmitted between two-wheel drive and four-wheel drive.

BACKGROUND OF THE INVENTION

One known mechanism for shifting the drive wheels to which engine power is transmitted from front or rear wheel drive to all four wheel drive is a transfer case. Generally speaking, the transfer case is fabricated integrally with the transmission. The transfer case is specifically adapted for use a connection with a particular transmission and the use of a different transfer case requires the use of or replacement of many differed parts. Thus, the transfer case is not well suited for use with different vehicles mod different transmissions.

Another known arrangement for effecting a shift between two-wheel drive and four-wheel drive is disclosed in Japanese Patent Publication No. 23330/1989. Here, a clutch is mounted to one output shaft of the differential on the axle side for coupling and uncoupling the engine power from a part-time four-wheel drive vehicle. When the engine power is coupled, the clutch is engaged to obtain the four-wheel-drive mode. When the engine power is uncoupled the clutch is disengaged to achieve the two-wheel-drive mode. In this way, the drive mode can be switched between the two-wheel-drive mode and the four-wheel-drive mode. Also, in the two-wheel-drive mode, the parts of the drive mechanism necessary for the four-wheel-drive mode are not needlessly driven.

In the arrangement disclosed in the above-cited Japanese Patent Publication No. 23330/1989, the clutch assembly in mounted an the output shaft side of the differential which undesirably increases the width of the differential. This clutch assembly also transmits torque after the final gear reduction. In the four-wheel-drive mode, large torque is imposed on the clutch assembly. Therefore, there arises the problem that the clutch assembly must be made of a material having great strength at must be made rather large in size to obtain sufficient strength.

In light of the foregoing, a need exists for a drive-mode shifting mechanism that does not suffer from the foregoing disadvantages and drawbacks.

It would thus be desirable to provide a drive-mode shifting mechanism for switching between two-wheel drive and four-wheel drive that need not be made of excessively strong material and that is not excessively large in size.

It would also be desirable to provide a drive-mode shifting mechanism for switching between two-wheel drive and four-wheel drive that has a wide range of use and is not limited to use in connection with a particular vehicle or transmission.

SUMMARY OF THE INVENTION

According to one aspect of the present invention, a vehicle drive system switchable between the two-wheel-drive mode and the four-wheel-drive mode includes a transmission, and a housing in which is disposed a differential gear connected to a pair at wheels and a drive-mode-shifting mechanism. The drive-mode-shifting mechanism includes a first shaft forming an input shaft for the differential gear, a second shaft for transmitting power from the transmission, and a clutch assembly for connecting the first and second shafts during the four-wheel-drive mode and for disconnecting and second shaft during the two-wheel-drive mode.

In the present invention the clutch assembly is mounted in the final drive gearset and so the mechanism for shifting between the two-wheel-drive mode and four-wheel-drive mode can be constructed rather simply by replacing one unit (final drive gearset) including the differential. Because the clutch assembly is mounted on the input side of the differential, the clutch assembly beings the first shaft into or out of engagement with the second shaft before speed is reduced by the gears of the differential. That is, the clutch assembly according to the present invention does not require the same degree of high strength as assemblies that are mounted an the output side of the differential. Consequently, where the same material in used a smaller clutch assembly can be built.

The first and second shafts are preferably mounted coaxially with one another, with the first shaft having a first spline on its outer surface and the second shaft having a second spline on its outer surface. The clutch assembly includes a shifting member having an internal spline that corresponds to the splines on the first and second shafts. The shifting member is able to move axially to couple the first and second shafts together by aligning the internal spline of the shifting member to the splines on both the first and second shafts.

The clutch assembly is advantageously mounted between the bearing that supports the first shaft and the bearing that supports the second shaft. In this way advantageous use is made of space which would otherwise be dead space. This permits the size of the assembly to be reduced. Furthermore, this clutch assembly can be used with different transmissions and different vehicles with greater ease.

The differential referenced herein refers to a differential assembly for absorbing the difference in rotational speed between the right and left drive wheels or between front and rear drive wheels to permit smooth driving. The differential can be a limited slip differential. The final drive gearset referenced herein refers to the land drive/differential assembly.

According to another aspect of the present invention, a vehicle drive system for a vehicle having four wheels is switchable between a two-wheel-drive mode in which only two of the wheels are driven and a four-wheel-drive mode in which all four of the wheels are driven, The vehicle drive system includes a transmission, a differential gear, and a drive mode-shifting mechanism positioned between the transmission and the differential gear for shifting between the two-wheel-drive mode and the four-wheel-drive mode. The drive mode-shifting mechanism is housed in a housing that is separate from and spaced from the transmission. The drive mode-shifting mechanism includes a first shaft, a second shaft and a clutch assembly for connecting the first shaft and the second shaft during the four-wheel-drive mode and for disconnecting the first shaft and the second shaft during the two-wheel-drive mode.

Another aspect of the present invention involves a vehicle drive system switchable between a two-wheel-drive mode and a four-wheel-drive mode, wherein the vehicle drive system includes a differential gear connectable to a pair of wheels, and a drive mode-shifting mechanism for shifting between the two-wheel-drive mode and the four-wheel-drive mode. The drive mode-shifting mechanism includes a first shaft forming an input shaft of the differential gear, a second shaft for transmitting power and a clutch assembly for connecting the first shaft and the second shaft during the four-wheel-drive mode and for disconnecting the first shaft and the second shaft during the two-wheel-drive mode.

BRIEF DESCRIPTION OF THE DRAWING FIGURES

Figure 2:
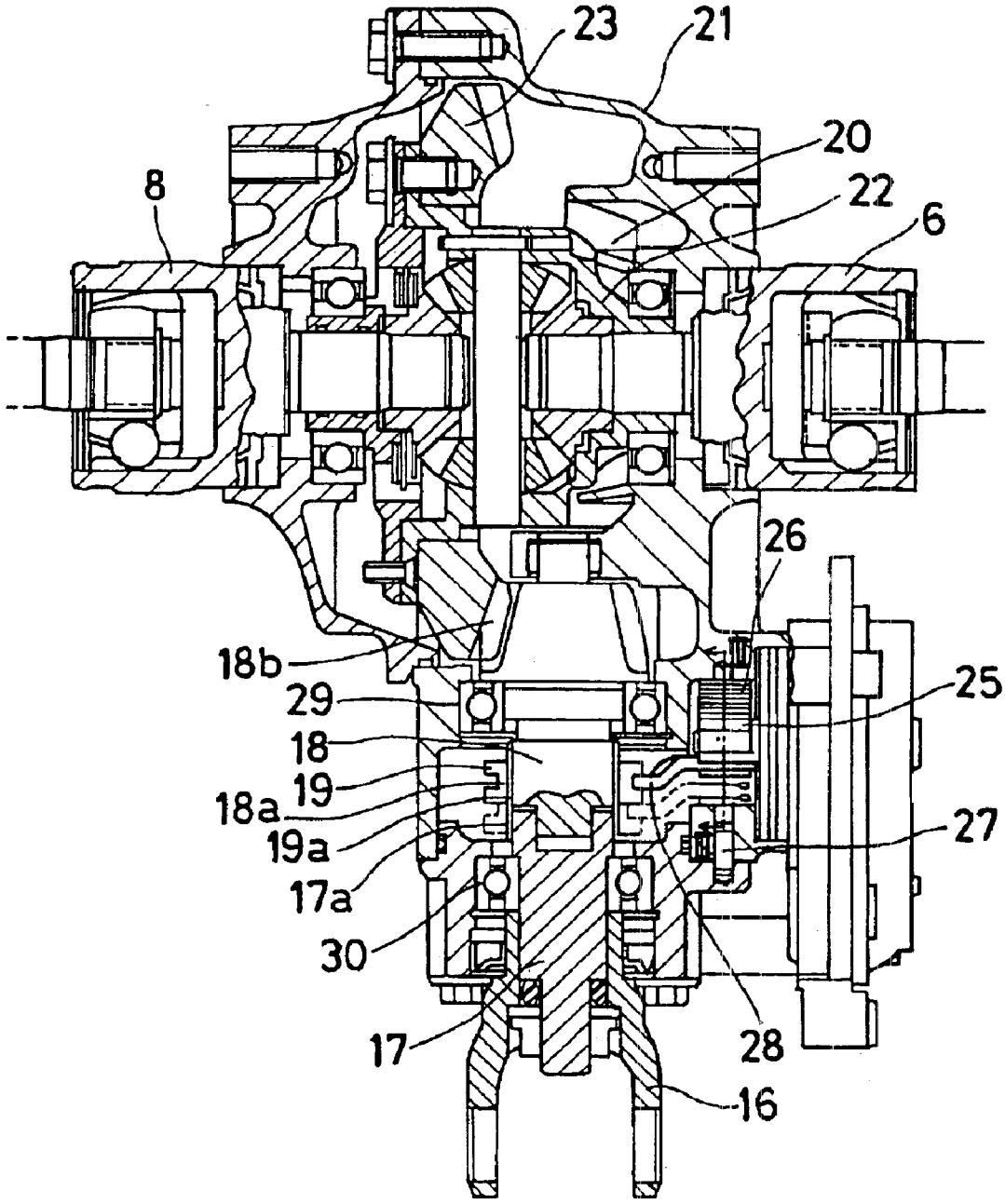
Figure 3:
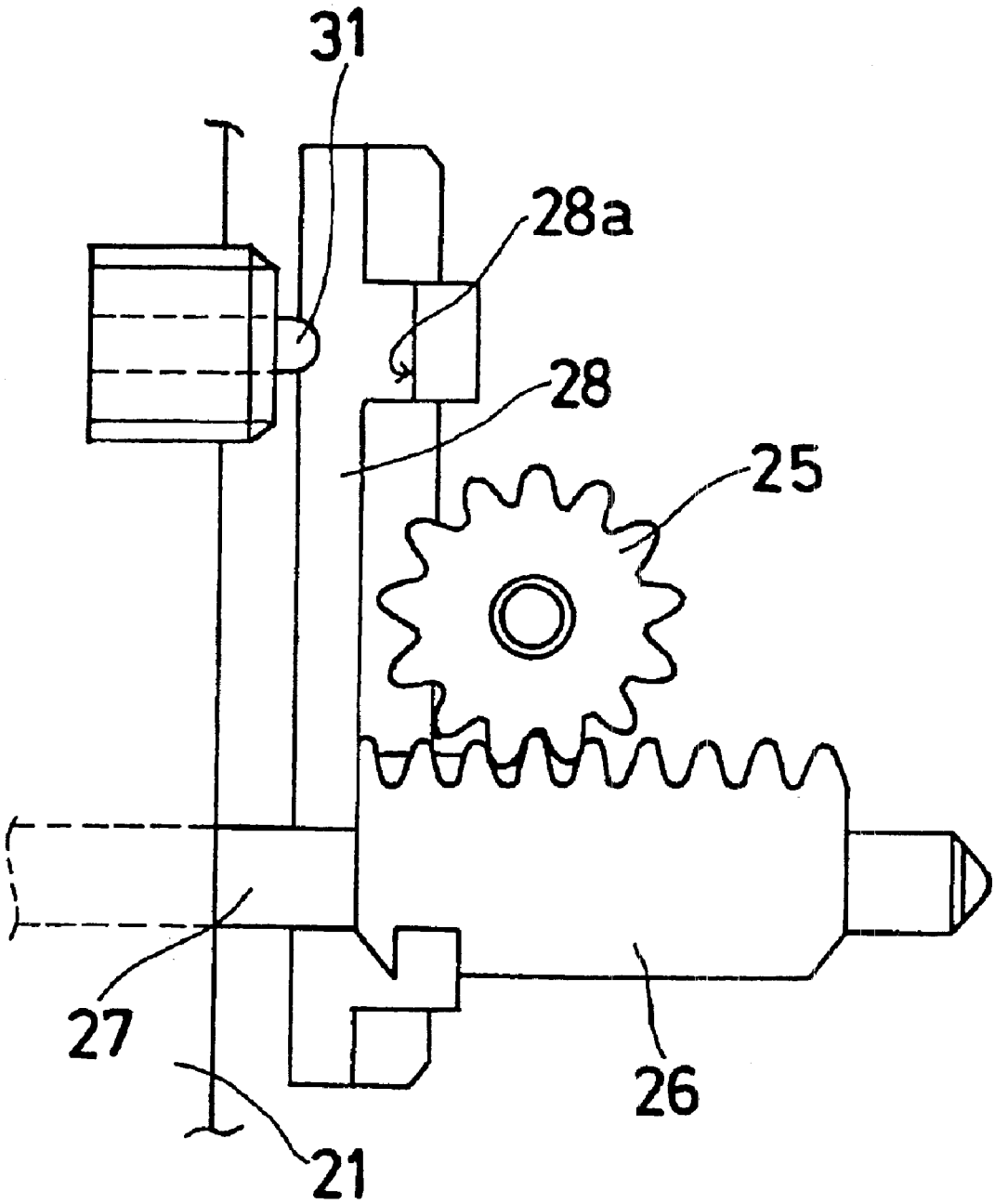

The foregoing and additional features and characteristics of the present invention will become more apparent from the following detailed description considered with reference to the accompanying drawing figures in which like reference numerals designate like elements and wherein:

FIG. 1 in a schematic diagram of a portion of a vehicle having a vehicle drive system provided with a drive mode-shifting mechanism in accordance with the present invention;

FIG. 2 is a cross-sectional view of main portions of the drive mode-shifting mechanism shown in FIG. 1; and FIG. 3 is an enlarged cross-sectional view of a portion of the drive mode-shifting mechanism taken along the section line III—III in FIG. 2.

DETAILED DESCRIPTION OF THE PREFERRED EMBODIMENT

A vehicle having a vehicle drive system equipped with a drive mode-shifting mechanism in accordance with the present invention is schematically shown in FIG. 1. In the embodiment discussed below, the vehicle is a rear wheel drive vehicle in which engine power is transmitted to the rear wheels at all times. In the two-wheel-drive mode, power transmission to the front wheels is interrupted.

As illustrated in FIG. 1, the vehicle includes an engine 1 acting as a power source, a transmission 2 connected to the output of the engine 1, a drive axle 4 having one end connected to the output side of the transmission 2 for transmitting power from the engine 1, and a shaft 17 (see FIG. 2) having one end connecting to one end of the drive axle 4 by way of a yoke 16 and the other end connected to a final drive gearset 5. A pair of front axles 6, 8 in connected to the final drive gearset 5, and a front wheel 7, 9 is attached to each of the front axles 6, 8 respectively. The vehicle also includes a pair of rear wheels 13, 15, each of which is connected to a respective rear axle 12, 14. The rear axles 12, 14 are connected to a final drive gearset 11 which is also connected to the transmission 2 by way of a shaft 30 and a yoke 32.

As seen in FIG. 2, a first shaft 18 in located in the final drive gearset 5. This first shaft 18 is mounted coaxially with respect to the shaft 17 that is connected to the drive axle 4 by way of the yoke 16 and to the first drive gearset 5. The shaft 17 constitutes a second shaft. The first shaft 18 is an input shaft to the front differential 20.

The drive mode-shifting mechanism of the present invention is mounted in the final drive gearset 5 and comprises the first shaft 18, the second shaft 17 mounted coaxially with the first shaft 18, and a clutch assembly capable of connecting and disconnecting the first shaft 18 and the second shaft 17. The first shaft is rotatable relative to a housing 21. A pinion gear 18b meshing with a ring gear 23 is mounted on the side of the differential 20, which in turn is mounted inside the housing 21. This differential 20 is housed in a differential case 22 that s mounted so as to be rotatable perpendicular to the axles 6, 8. The ring gear 23 meshing with the pinion gear 18b is mounted in the differential case 22. The second shaft 17 is adjacent to the outer end of the first shaft 18 and is rotatable relative to the housing 21. The yoke 16 is fixedly mounted to the output shaft of the transmission and to an end of the second shaft 17, and transmits engine power to the second shaft 17. The yoke 16 permits the second shaft 17 to move or pivot relative to the drive axle 4.

The construction of the clutch assembly is as follows. The clutch assembly includes a shifting member 19 located between the first shaft 18 and the second shaft 17, and shifting member 19 is capable of connecting and disconnecting the first shaft 18 and the second shaft 17. An internal spline 19a is formed on the inner surface of the shifting member 19. This internal spline 19a corresponds to and is capable of engaging a first spline 18a formed on the outer surface of the first shaft 18 and a second spline 17a formed on the outer surface of the second shaft 17. This shifting member 19 is adapted to slide axially along the splines 18a, 17a on the first and second shafts 18, 17.

A shifting device for producing axial sliding movement of the shifting member 19 includes an output gear 25 and a rack 26. As the output gear 25 turns, the rack 26 slides relative to a shaft 27 that in mounted to the housing 21. The output gear 25 in rotated through operation of an electric motor and the operation of the motor in controlled by an electronic control unit (ECU). The ECU is connected to, for example, a switch which affects operation of the motor. The output gear 25 is mounted on the motor via a spiral spring. When the motor is driven, power is transmitted to the output gear 25 via the spring. As the output gear 25 rotates, the rack 26 moves axially. An element in the form of a fork 28 is firmly fixed to the rack 26 and so axial movement of the rack 26 also causes axial movement of the fork 28. Accordingly, the shifting member 19, which is rigidly affixed to one end of the fork 28, can be axially slid along the splines on the first and second shafts 18,17 through movement of the fork 28.

In accordance with the present invention, a switch-depressing portion 28a in mounted integrally with the fork 28. During four-wheel drive, the fork 28 is moved to push the switch-depressing portion 28a against a switch 31. In this way, the four-wheel-drive mode is electrically detected. Because the switch 31 in turned on and off, using the fork 28 independent of the rotation of the first shaft 18 and the second shaft 17, wear of the switch 31 is prevented. As a result, the durability of the switch 31 is improved.

The operation of the drive-mode switching mechanism of the present invention is as follows. When the vehicle is in the four-wheel-drive mode, the shifting member 19 is splined to both the first shaft 18 and the second shaft 17. Torque from the output shaft of the transmission 2 is transmitted to the yoke 16, the second shaft 17, the first shaft 18, the ring gear 23, and the differential case 22 in this order. Power is then transmitted via the front axles 6, 8 to the front wheels 7, 9 that are the drive wheels. When the vehicle makes a turn, the front wheels 7, 9 produce a difference in travel with respect to the rear wheels 13, 15, resulting the a difference in rotational speed between the front wheels 7, 9 and the rear wheels 13, 15. Therefore, if the four-wheel-drive mode is maintained, the steering effort is undesirably increased.

Accordingly, if the front and rear wheels produce any difference in rotational speed, the output gear 25 is rotated in the opposite direction from that described above, causing the shifting member 19 to slide axially. This rotational speed differential can be determined by speed sensors. This disconnects the shifting member 19 from the second shaft 17. Under this condition, the two-wheel-drive mode is achieved, i.e., engine power is no longer transmitted to the first shaft 18. In this way, the difference in rotational speed between the front and rear wheels can be absorbed and converted into rotation between the first shaft 18 and the second shaft 17. This reduces the steering effort.

However, where the torque between the shifting member 19 and the second shaft 11 is large and thus the shifting member 19 cannot slide axially, even if the motor operates, the shifting member 19 cannot axially slide. The aforementioned spiral spring mounted between the output shaft of the motor and the output gear 25 then deflects. When the torque in the second shaft 17 is reduced to a level that allows the shifting member 19 to slide, the output shaft 25 rotates, thus producing sliding movement of the shifting member 19. The shifting member 19 splined to both the first shaft 18 and the second shaft 17 is then splined to only the first shaft 18. As a result only the rear wheels 13, 15 we allowed to be driven. That is, the two-wheel-drive mode is achieved. The shifting member 19 and the fork 28 thus assume the state indicated by the solid line in FIG. 2.

The drive mode is shifted from the two-wheel-drive mode to the four-wheel-drive mode in the manner described below. To return to the four-wheel-drive mode, the shifting device actuates the output gear 25 so that the shifting member 19 slides axially. The shifting member 19 can then engage both the first shaft 18 and the second shaft 17. Thus, torque from the output shaft of the transmission 2 is transmitted to The front wheels 7, 9, as well as to the rear wheels 13, 15. If the internal spline 19a on the shifting member 19 and the second spline 17c on the second shaft 17 are out of phase and the sliding member 19 cannot slide, the shifting member 19 in unable to slide even if the motor is operated. The aforementioned spiral spring located between the output shaft of the motor and the output gear 25 thus deflects. When the internal spline 19a on the shifting member 19 and the second spline 17a on the second shaft 17 are located in phase due to slippage of the rear wheels, for example, the output gear 25 actuates to slide the shifting member 19, thus splining the shifting member 19 to both the first shaft 18 and the second shaft 17. This in the instant when a shift is made from the two-wheel-drive mode to the four-wheel-drive mode. The shifting member 19 and the fork 28 are then in the state indicated by the dot-and-dash him in FIG. 2.

In, accordance with the present invention, a shift is made at will between the two-wheel-drive mode and the four-wheel-drive mode by operating the clutch assembly. That is the driver operates a shifting switch (not shown) to electrically turn on or off the motor or to switch the direction of electrical energization. Alternatively, rotational speed sensors may be mounted on the front and rear wheels. Any difference in rotational speed between the front and rear wheels is then detected by the electronic control unit (ECU). The motor is then electronically energized to effect a shift from the four-wheel-drive mode to the two-wheel-drive mode. If the ECU senses that the rotational speed difference bas decreased to zero, the direction of energization of the motor is reversed as compared to the situation where a shift is made to the two-wheel-drive mode. In this way, a shift is made from the two-wheel-drive mode to the four-wheel-drive mode.

According to the present invention, when the splined shafts are out of phase or the torque is large, the sliding movement of the shifting member 19 is limited through use of the spiral spring. It is to be understood, however, that the use of the spiral spring is not essential to the present invention. Rather, any type of mechanism may be used as long as the shifting member 19 is inhibited from sliding before the splines are located in phase with one another.

Also, in the present invention, the switching member is mounted between the bearing 29 supporting the first shaft 18 and the bearing 30 supporting the second shaft 17. Consequently, use is advantageously made of space which would have been dead space in other known constructions. This permits the assembly to be made smaller.

Furthermore, this clutch assembly can be used without having to make any modifications to the transmission or without having to use a different transmission. In addition, the steering force can be reduced by making a shift from the four-wheel-drive mode to the two-wheel-drive mode.

According to the present invention, engine power is transmitted directly to the output axle without being transmitted via a transfer ease. The invention can also be applied to a structure in which a transfer case is mounted between the transmission and the output axles of the front and rear wheels. In the embodiment described above, the differential 20 is a limited-slip type differential. However, as an alternative, an open type differential can be used.

In accordance with the present invention, the clutch assembly is mounted in the final drive gearset. Therefore, a mechanism permitting the driver to effect a shift between the two-wheel-drive mode and the four-wheel-drive mode can be constructed simply by replacing only the final drive gearset including the differential. Also, the clutch numbly is mounted on the input side of the differential. Consequently, the clutch amounts and disconnects the first And second shafts before the speed is reduced by the gears of the differential. That is, the clutch assembly according to the present invention does not require high strength, unlike other known clutch assemblies mounted an the output side of the differential. Consequently, where the same material is used, a smaller clutch assembly can be built.

As noted above, by mounting the clutch assembly between the two bearings that support the first and second shafts, advantageous use is made of space which would otherwise have been dead space. This permits the size of the assembly to be reduced. Further, the clutch assembly of the present invention can advantageously be used without the need for significant modifications to the transmission and without the need for different transmissions.

The principles, a preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicle drive system switchable between two-wheel-drive mode and a four-wheel-drive mode comprises:

a transmission;

a housing in which is disposed a differential gear connected to a pair of wheels and a drive-mode-shifting mechanism;

the drive-mode-shifting mechanism including a first shaft forming an input shaft for the differential gear, a second shaft for transmitting power from the transmission, and a clutch assembly for connecting the first and second shafts during the four-wheel-drive mode and for disconnecting the first and second shafts during the two-wheel-drive mode*; and*

*the clutch assembly being operated by an electric motor*.

2. A vehicle drive system according to claim 1, including a drive axle extending between the transmission and the housing.

3. A vehicle drive system according to claim 1, wherein said first and second shafts are mounted coaxially.

4. A vehicle drive system according to claim 1, wherein said firm shaft has an outer surface provided with a first spline, and second shaft has an outer surfaces provided with a second spline, and said clutch assembly includes an axially movable shifting member provided with an internal spline, said shifting member being movable between a first position in which the internal spline on the shifting member is in engagement with the first spline on the first shaft and the second spline on the second shaft to achieve the four-wheel-drive mode and a second position in which the internal spline on the shifting member is in engagement with the first spline on the first shaft and is out of engagement with the second spline on the second shaft to achieve the two-wheel-drive mode.

5. A vehicle drive system according to claim 4, including a shifting device for moving the shifting member between the first and second positions.

6. A vehicle drive system according to claim 5, wherein the shifting device includes an element fixed to the shifting member, a rack to which is fixed the element, and a gear for moving the rack.

7. A vehicle drive system according to claim 6, including a switch-depressing portion provided on said element, and a switch operated by the switch-depressing portion during movement of said element.

8. A vehicle drive system for a vehicle that includes four wheels and is switchable between a two-wheel-drive mode in which only two of the wheels are driven and a four-wheel-drive mode in which all four of the wheels are driven comprising:

a transmission;

a differential gear;

a drive mode-shifting mechanism positioned between the transmission and the differential gear for shifting between the two-wheel-drive mode and the four-wheel-drive mode, the drive mode-shifting mechanism including a first shaft, a second shaft and a clutch assembly for connecting the first shaft and the second shaft during the four-wheel-drive mode and for disconnecting the first shaft and the second shaft during the two-wheel-drive mode;

*the clutch assembly being operated by an electric motor to effect the shifting between the two-wheel-drive mode in which the first shaft and the second shaft are disconnected and the four-wheel-drive mode in which the first shaft and the second shaft are connected;* and the vehicle drive system being devoid of a differential between the transmission and the drive mode-shifting mechanism.

9. A vehicle drive system according to claim 8, including a housing which houses the drive mode-shifting mechanism and the differential gear.

10. A vehicle drive system according to claim 8, wherein said first and second shaft are mounted coaxially.

11. A vehicle drive system according to claim 8, including a drive axle extending from the transmission, and a yoke connected a the drive axle and to an end of the second shaft opposite the first shaft for permitting the drive axle and the second shaft to pivot relative to our another.

12. A vehicle drive system according to claim 8, wherein said first shaft forms an input shaft for the differential gear.

13. A vehicle drive system according so claim 8, wherein said first shaft has an outer surface provided with a first spline, said second shaft has an outer surface provided with a second spline, and said clutch assembly includes an axially movable shifting member provided with an internal spline, said shifting member being movable between a first position in which the internal spline on the shifting member is in engagement with the first spline on the first shaft and the second spline or the second shaft to achieve the four-wheel-drive mode and a second position in which the internal spline on the shifting member is in engagement with the first spline on the first shaft and is out of engagement with the second spline on the second shaft to achieve the two-wheel-drive mode.

14. A vehicle drive system according to claim 13, including a shifting device for moving the shifting member between the first and second positions.

15. A vehicle drive system according to claim 14, wherein the shifting device includes an element fixed to the shifting member, a rack to which is fixed the element, and a gear for moving the rack.

16. A vehicle drive system according to claim 15, including a switch-depressing portion provided on said element, and a switch operated by the switch-depressing portion during movement of said element.

17. A vehicle drive system switchable between a two-wheel-drive mode and a four-wheel-drive mode, comprising:

a drive axle;

a differential gear connectable to a pair of wheels;

a drive mode-shifting mechanism for shifting between the two-wheel-drive mode and the four-wheel-drive mode, the drive mode-shifting mechanism including a first shaft forming an input shaft of the differential gear, a second shaft for transmitting power, and a clutch assembly for connecting the first shaft and the second shaft during the four-wheel-drive mode and for disconnecting the first shaft and the second shaft during the two-wheel-drive mode;

*the clutch assembly including a shifting member axially shifted through operation of an electric motor to effect the switching between the four-wheel-drive mode and the two-wheel-drive mode;* and a yoke connected to the drive axle and an end of the second shaft opposite the first shaft for permitting the drive axle and the second shaft to pivot relative to one another.

18. A vehicle drive system according to claim 17, wherein said first and second shafts are mounted coaxially.

19. A vehicle drive system according to claim 17, wherein said first shaft has an outer surface provided with a first spline, said second shaft has an outer surface provided with a second spline, and said [clutch assembly includes an axially movable] shifting member *being* provided with an internal spline, said shifting member being movable between a first position in which the internal spline on the shifting member is in engagement with the first spline on the first shaft and the second spline an the second shaft to achieve the four-wheel-drive mode and a second positions in which the internal spline on the shifting member is in engagement with the first spline an the first shaft and is out of engagement with the second spline on the second shaft to achieve the two-wheel-drive mode.

20. A vehicle drive system according to claim 19, including a shifting device for moving the shifting member between the first and second positions, said shifting device including as element fixed to the shifting member, a rack to which said element is fixed, and a gear for moving the rack.

*21. A vehicle drive system according to claim 1, including a first spline directly formed on an outer surface of the first shaft, the clutch assembly including an axially movable shifting member that is axially moved through operation of the electric motor, the shifting member possessing an inner surface with an internal spline formed on the inner surface of the shifting member, the internal spline of the shifting member being engageable with the first spline of the first shaft.*

*22. A vehicle drive system according to claim 1, wherein the clutch assembly includes an axially movable shifting member, the electric motor being operatively connected to an element which engages the shifting member to axially move the shifting member during operation of the electric motor.*

*23. A vehicle drive system according to claim 22, wherein the element engaging the shifting member is a fork.*

*24. A vehicle drive system according to claim 1, wherein the four-wheel-drive mode is electrically detected.*

*25. A vehicle drive system according to claim 8, including a first spline directly formed on an outer surface of the first shaft, the clutch assembly including a shifting member possessing an inner surface with an internal spline formed directly on the inner surface of the shifting member, the internal spline of the shifting member being engageable with the first spline of the first shaft.*

*26. A vehicle drive system according to claim 25, wherein the internal spline of the shifting member engages the first spline of the first shaft during both the four-wheel-drive mode and the two-wheel-drive mode.*

*27. A vehicle drive system according to claim 25, wherein the electric motor is operatively connected to an element which engages the shifting member to axially move the shifting member during operation of the electric motor.*

*28. A vehicle drive system according to claim 8, wherein the four-wheel-drive mode is electrically detected.*

*29. A vehicle drive system according to claim 17, including a first spline directly formed on an outer surface of the first shaft, the shifting member possessing an inner surface with an internal spline formed directly on the inner surface of the shifting member, the internal spline of the shifting member being engageable with the first spline of the first shaft.*

*30. A vehicle drive system according to claim 29, wherein the internal spline of the shifting member engages the first spline on the first shaft during both the four-wheel-drive mode and the two-wheel-drive mode.*

*31. A vehicle drive system according to claim 17, wherein the electric motor is operatively connected to an element engaging the shifting member to axially move the shifting member during operation of the electric motor.*

*32. A vehicle drive system according to claim 17, wherein the four wheel-drive-mode is electrically detected.*

*33. A vehicle drive system switchable between two-wheel-drive mode and a four-wheel-drive mode comprises:*

*a transmission;*

*a housing in which is disposed a differential gear connected to a pair of wheels and a drive-mode-shifting mechanism;*

*the drive-mode-shifting mechanism including a first shaft forming an input shaft for the differential gear, a second shaft for transmitting from the transmission, and a clutch assembly for connecting the first and second shafts during the four-wheel-drive mode and for disconnecting the first and second shafts during the two-wheel-drive mode;*

*the first shaft having an outer surface with a first spline directly formed on the outer surface of the first shaft;*

*the clutch assembly including an axially movable shifting member having an inner surface with an internal spline formed on the inner surface of the shifting member, the internal spline of the shifting member and the first spline of the first shaft engaging one another in both the two-wheel-drive mode and the four-wheel-drive mode;*

*the shifting member being engaged by an element which is operatively connected to an electric motor so that operation of the electric motor axially moves the shifting member between one position in the two-wheel-drive mode in which the first and second shafts are disconnected and another position in the four-wheel-drive mode in which the first and second shafts are connected to one another by the shifting member.*

*34. A vehicle drive system according to claim 33, wherein the four-wheel-drive mode is electrically detected.*

* * * * *

UNITED STATES PATENT AND TRADEMARK OFFICE

CERTIFICATE OF CORRECTION

PATENT NO. : RE 39,054 E
APPLICATION NO. : 10/284507
DATED : April 4, 2006
INVENTOR(S) : Toru Kagata and Masumi Kazaoka It is certified that error appears in the above-identified patent and that said Letters Patent is hereby corrected as shown below:

Column 7, line 15, claim 4, change “firm” to --first--.

Column 7, line 16, claim 4, change “and” to --said--.

Column 7, line 16, claim 4, change “surfaces” to --surface--.

Column 7, line 67, claim 10, change “shaft” to --shafts--.

Column 8, line 3, claim 11, change “a” to --to--.

Column 8, line 5, claim 11, change “our” to --one--.

Column 8, line 16, claim 13, change “or” to --on--.

Column 8, line 66, claim 19, change “an” to --on--.

Column 8, line 67, claim 19, change “positions” to --position--.

Column 9, line 2, claim 19, change “an” to --on--.

Column 9, line 8, claim 20, change “as” to --an--.

Column 10, line 14, claim 32, between the words “four” and “wheel” insert a hyphen.

Column 10, line 23, claim 22, after “transmitting” insert -- power--.

Signed and Sealed this

Sixteenth Day of January, 2007

JON W. DUDAS
*Director of the United States Patent and Trademark Office*